US006865474B2

(12) United States Patent
Braun et al.

(10) Patent No.: US 6,865,474 B2

(45) Date of Patent: Mar. 8, 2005

(54) CONTROL DEVICE FOR AN INTERNAL COMBUSTION ENGINE

(75) Inventors: Guenter Braun, Bietigheim (DE); Rainer Sommer, Stuttgart (DE); Frank Worbis, Ludwigsburg (DE); Taskin Ege, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/732,123

(22) Filed: Dec. 9, 2003

(65) Prior Publication Data

US 2004/0153237 A1 Aug. 5, 2004

(30) Foreign Application Priority Data

Dec. 10, 2002 (DE) ........................................ 102 57 557

(51) Int. Cl.[7] ................................................ G06F 19/00

(52) U.S. Cl. ......................... 701/115; 701/99; 701/102; 701/111; 701/114

(58) Field of Search .......................... 701/99, 101, 102, 701/111, 114, 115

(56) References Cited

U.S. PATENT DOCUMENTS 5,506,777 A * 4/1996 Skrbina et al. ............. 701/102

5,550,740 A * 8/1996 Hall et al. ..................... 701/99

6,760,659 B1 * 7/2004 Cowen ....................... 701/113

* cited by examiner

*Primary Examiner*—Willis R. Wolfe

*Assistant Examiner*—Johnny H. Hoang

(74) *Attorney, Agent, or Firm*—Kenyon & Kenyon

(57) ABSTRACT

A control device for an internal combustion engine includes a control circuit and at least one interface for communication of the control circuit with a sensor and/or an actuator for detecting and/or controlling of operating parameters of the internal combustion engine, as well as an additional interface for communication with a dynamo-electric generator, for detecting and/or controlling of operating parameters of the generator.

16 Claims, 1 Drawing Sheet

CONTROL DEVICE FOR AN INTERNAL COMBUSTION ENGINE

FIELD OF THE INVENTION

The present invention relates to electronic control devices used to regulate the combustion process in the individual cylinders of internal combustion engines, taking various parameters into account in the process.

BACKGROUND INFORMATION

The following are among the conventional tasks of a control device for internal combustion engines: metering the fuel quantity injected into each cylinder according to an output demand as predefined by an accelerator-pedal position, for example; regulating the fresh-air supply to the cylinders in conformance with the injected fuel quantity in order to realize a desired air-fuel ratio for the combustion process; and establishing suitable ignition timing for the combustion process. To this end, modern engine-control devices utilize measured values of operating parameters of the internal combustion engine itself, which are detected by appropriate associated sensors. However, in doing so they fail to use the full range of parameters that could be utilized in a motor vehicle to realize a regulation of the engine output that corresponds precisely to the driver's wishes.

SUMMARY OF THE INVENTION

The control device according to the present invention makes it possible to control the internal combustion engine of a vehicle in such a way that even those vehicle parameters that are not directly related to the internal combustion engine are taken into account, thereby improving the output control of the internal combustion engine and, should the need arise, making available power reserves that are not attainable using current control devices. These advantages are achieved since the control device according to the present invention is not only equipped with interfaces that communicate with sensors and/or actuators detecting or controlling the operating parameters of the internal combustion engine, but the control device is also in connection with an interface which is connected to an electric generator of the vehicle, so that its operating parameters may be detected or controlled. In this manner, it is possible for the control of the internal combustion engine to take into account the state of the electric generator, and vice versa.

For example, in controlling the internal combustion engine, the control device may take into consideration the start-up of the generator by stepping up the torque setting according to the mechanical load the generator places on the internal combustion engine. In this way, the available power for driving th vehicle is kept constant. In an example embodiment, it is the control device itself that controls the electrical power output of the generator, via the interface, and thus its mechanical load exerted on the internal combustion engine. At a time of high mechanical demands on the internal combustion engine, i.e., demands which approach the limit of capacity, e.g., during an acceleration maneuver or when driving uphill, the present invention allows the control device to temporarily take the generator out of operation, for example, so as to have the full power of the internal combustion engine available for driving the vehicle. In the same manner, when the internal combustion engine is in an idle state, the control device may be used to suppress an abrupt start-up of the generator, which might result in undesired speed fluctuations of the internal combustion engine. Instead, the control device may be utilized to gradually increase the mechanical load placed on the internal combustion engine by the generator, over a longer period of time, in this way preventing instabilities of the internal combustion engine.

In order to allow an exchange of complex information between the control device and the generator, and also to permit bi-directional communication between the two, the interface may use a frame-oriented protocol for the communication with the generator. Such a protocol permits the transmission capacity of a data connection to be split up between the control device and the generator, into transmission times for the control device and for the generator. Since it is possible to transmit not only a value of a parameter within a frame, but its designation as well, it is possible to exchange values of a multitude of parameters between the control device and the generator, using a single line.

An interface that supports the BSS (Bit Synchronous Single-wire Network) protocol may be used as the interface for the communication with the generator.

In order to limit the cost for the development of a control device according to the present invention and to make it easier to implement the present invention based on existing control-device concepts, it is desirable to modularize the various tasks of the control device to the greatest possible extent. These tasks are related, on the one hand, to decisions regarding how to trigger the generator and, on the other hand, to the transmission of the corresponding control information to or from the generator. One important aspect of the modularization concerns the separation of those parts of the control device that must implement the decision processes (and are referred to as control processors in this context), from those parts (referred to as synchronization circuit here) that are responsible for transmission of the control data, adapted to the frame clock of the interface, between the control device and the generator.

Also important for an effective development work is the ability to write the development processes independently of possible special features of the protocol used between the interface and the generator. These protocols are constantly modified, and the necessity may arise in the future that, due to technical developments, a control device needs to be designed that carries out the same tasks as the control device according to the present invention, but uses an entirely different protocol for the communication with the generator. In such a case, in order to be able to continue using the program that encodes the decision processes of the control processor in unchanged form, if possible, it is useful to employ a control processor able to handle a plurality of processes (which may be designed both as an individual processor component and also as a group of processor components that are autonomous, but cooperate with one another). Furthermore, it is useful to have this processor implement at least one management process, which may include the above-mentioned decision process, and a translation process that converts a request received from the management process, to detect an operating parameter of the generator or to set it to a given value, into a message that is compatible with the protocol supported by the interface. If a modification of the protocol is required in such a control device, it is sufficient to adapt the translation process; the management process may remain unchanged.

DETAILED DESCRIPTION

Figure 1:
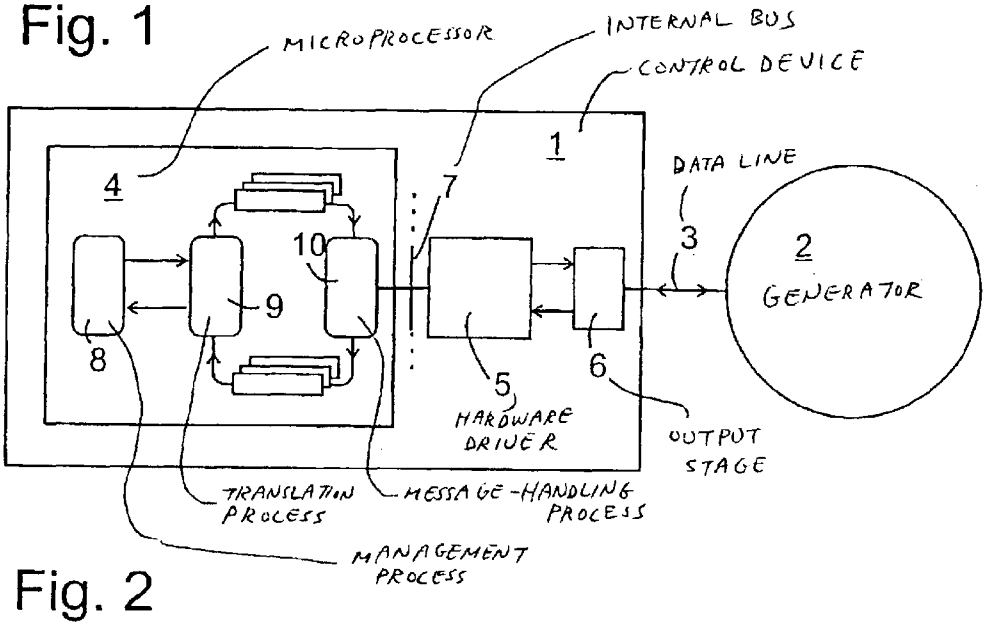
FIG. 1 shows a block diagram of a control device according to the present invention and a generator connected thereto.

FIG. 1 shows a schematic illustration of the physical and logical structure of a control device according to the present invention for an internal combustion engine (not shown), which communicates with an electric generator, driven by the internal combustion engine, via a data line 3. Control device 1 includes three circuit components that differ physically from each other, namely a microprocessor or microcontroller 4, a hardware driver 5 implemented as ASIC, and an output stage 6. Hardware driver 5 communicates with the microprocessor, for example, via an internal bus 7 of the control device, to which bus various additional interface components for the communication with sensors or actuators arranged on the internal combustion engine may be connected. Since these interface components are of the conventional type, they are not shown in the figure and also not further described.

Microprocessor 4 is designed to implement a multitude of processes simultaneously or with temporal overlap. Here, example processes shown include management process 8, translation process 9 and message-handling process 10.

The object of management process 8 is to determine the values of parameters to be controlled or instants for control actions, on the basis of operating-parameter values measured at the internal combustion engine, generator 2 or at other locations of the motor vehicles and provided to management process 8 by translation process 9 in a form that is independent of both microprocessor 4 itself and the other circuit elements 5, 6 participating in the communication of microprocessor 4 with external devices, such as generator 2. Furthermore, management process 8 in turn supplies the parameter values or instants thus obtained to translation process 9 in a form that is independent of the circuit structure, with the translation process 9 then forwarding the parameter values or instants. Such a communication between management process 8 and translation process 9, which is independent of the circuit structure, may be implemented, for example, when management process 8, in an effort to determine an instantaneous value of a given parameter, queries a specified memory location in the memory of microprocessor 4, which the translation process regularly overwrites with updated values of the particular parameter, or when management process 8 calls up a subprogram associated with translation process 9, which returns a value of the particular parameter.

Essential for an efficient programmability is that, from the point of view of management process 8, the determination of an actual parameter value does not differ from any other memory query or from calling up a function that operates on the basis of processor-internal variables exclusively. Operations required to be implemented specifically in order to query the particular parameter values are carried out solely by translation process 9.

Translation process 9 provides management process 8 with the necessary parameter values, and/or relays control commands generated by management process 8, e.g., for switching the generator on or off, or parameter values such as a desired generator output. Translation process 9 accomplishes this by converting the parameter values and/or control commands into bit sequences that correspond to the format of frames transmittable on data line 3 and which correspond in each case to messages in the protocol used on data line 3, namely the BSS protocol. Message handling process 10 in turn brings these messages into a format that is suitable for transmission on internal bus 7 and transmits the messages from there. The division of the functions between translation process 9 and message-handling process 10 has the result that translation process 9 operates completely independently of a protocol used on internal bus 7 and only considers the properties of the protocol used on external data line 3. Message-handling process 10 in turn is able to "package" the messages generated by translation process 9 into packages transmittable on internal bus 7, without having to consider the type of protocol used on data line 3 and the type of message received from translation process 9 in this protocol.

As a result of this three-way split of the program-controlled components of control device 1, management process 8 has to consider in its operation neither the special features of internal bus 7 nor those of data line 3 and may therefore be transferred, in virtually unchanged form, to a newly developed control device that uses a modified protocol on bus 7 or data line 3. Translation process 9 is in turn independent of the type of communication on internal bus 7, so that it may remain unchanged when the bus protocol is modified. Message-handling process 10 is in turn independent of the protocol on data line 3 (or also of protocols used on other data lines, not shown, to sensors or actuators installed on the internal combustion engine and triggered in a manner that is analogous to that of data line 3, via hardware drivers (not shown in the figure)).

Hardware driver 5 extracts from the data flow it receives via bus 7 the frames in BSS format generated by translation process 9, then synchronizes the frames with the frame clock used on data line 3 and converts each individual bit of a frame received in this manner into a width-modulated pulse whose width indicates the value, 0 or 1, of the bit. The pulse train thus obtained is used to trigger output stage 6, which outputs the pulses onto data line 3 with the required power output.

The transmission of data in the reverse direction is carried out in a corresponding manner in that a pulse train coming from generator 2 is converted, via the output stage and hardware driver 5, into a format able to be transmitted on internal bus 7, with the message-handling process 10 again extracting the BSS messages therefrom and the translation process identifying parameter values contained in the messages and supplying these to microprocessor 4.

Figure 2:
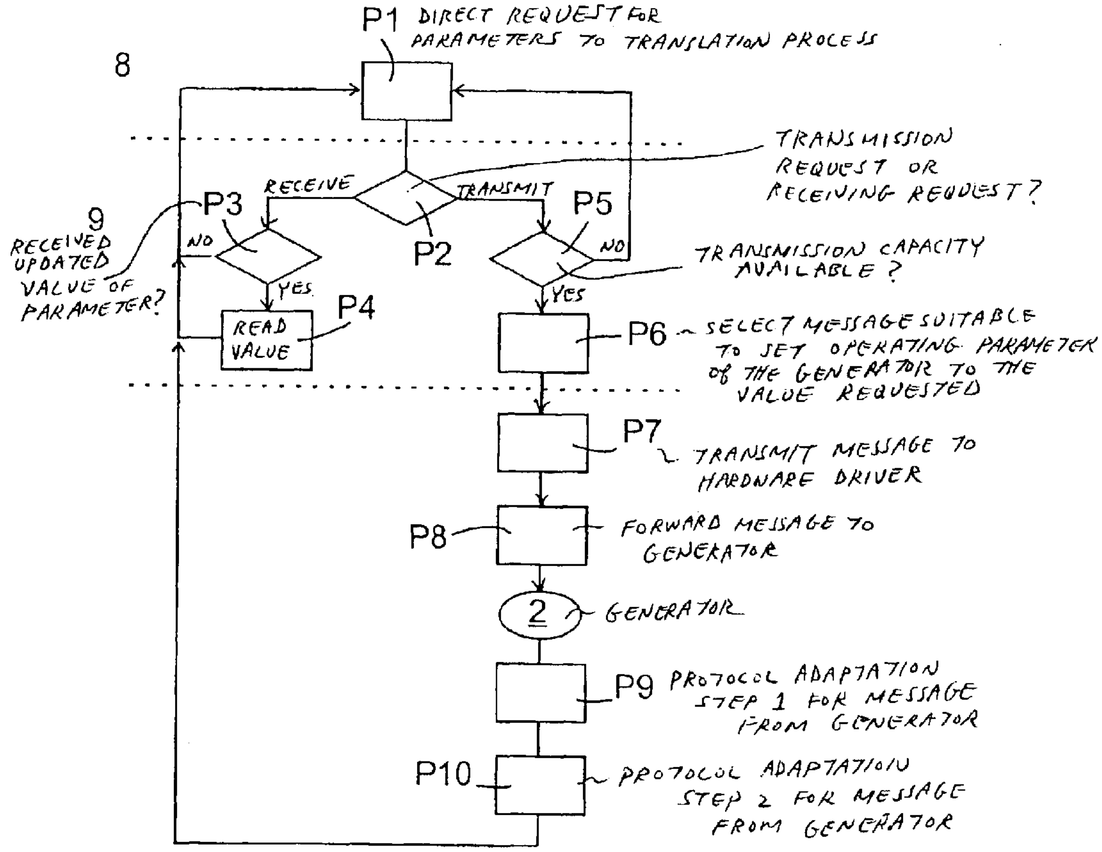
FIG. 2 shows a flow chart illustrating the communication between the control device and the generator.

A flow chart of the communication in control device 1 is shown in FIG. 2. P1 denotes any program part of management process 8 that directs a request to translation process 9 for the receiving or transmittal of parameters. Translation process 9 decides in P2 whether a transmission request or a receiving request is involved. If it is a receiving request, the translation process decides in P3 whether it has received an updated value of the parameter via message-handling process 10 since the most recent query by P1 concerning this parameter. If this is the case, the parameter value is stored in a buffer of translation process 9, the translation process reading the value in step P4 and returning it to P1. If no updated value of the parameter is available, it is possible in P4, depending on the type of parameter involved, that the still buffered value, queried once already, is returned to P1 again; it is also possible that an error message is returned indicating that no actual value is available. In the latter case, management process 8 may make another attempt to query the parameter value at a later time. If, in the time period between two such receiving requests, translation process 9 receives a message containing a new value of the parameter, it buffers it and, upon arrival of the next receiving request from management process 8, makes it available to it.

If the access request of the management process involves a transmission request, translation process 8 first checks in step P5 whether transmission capacity is available for transmitting the request. If this is not the case, a message is returned to the calling program part P1, indicating that no transmission is possible. Management process 8 may then repeat the request at a later time; in the meantime, due to the feedback, it is able to take the fact into account that the execution of the transmission command is delayed. Once transmission capacity is available again, translation process 9 selects from among the various messages defined in the BSS protocol one that is suitable to set an operating parameter of the generator, specified in the access request of the management process, to the value (P6) requested by the management process. Via internal bus 7, management-handling process 10 transmits the message thus defined to hardware driver 5 (P7), which forwards it to generator 2 (P8) via line 3.

A reply message returned from there and messages sent by generator 2, perhaps periodically without prior request, reach translation process 9 after steps P7, P8, protocol conversion steps, and P9, P10, protocol adaptation steps, respectively. On the basis of the parameters specified in the messages and their values, translation process 9 updates memory locations of its buffer specifically assigned to the parameters, so that a later request by management process 8 to read a particular parameter value may be processed by means of a simple reading of the instantaneous value in the buffer. It will not be necessary for messages requesting the actual parameter value to be transmitted repeatedly by generator 2 on data line 3.

A buffering of data to be transmitted to generator 2 or buffering of data it receives is generally desirable in order to rapidly supply message-handling process 8 with the required parameter values, since processes 9, 10, hardware driver 5 and output stage 6 have no possibility of detecting in advance when management process 8 will query a particular parameter value. However, it is possible that the buffering of the parameter values is not implemented in translation process 9, but in message-handling process 10 instead (in particular in the form of a buffering of complete BSS messages) or in hardware driver 5.

What is claimed is:

1. A control device for an internal combustion engine, comprising:

a control circuit;

a first interface for communication of the control circuit with at least one of a sensor and an actuator for one of detecting and controlling operating parameters of the internal combustion engine; and a second interface for communication of the control circuit with an electric generator for one of detecting and controlling operating parameters of the generator;

wherein the second interface uses a frame-oriented data-transfer protocol for communication with the generator, wherein the control circuit includes a control processor and a synchronization circuit, the control processor generating requests for one of transmitting and receiving data via the second interface, without synchronization with a frame clock of the second interface, and wherein the synchronization circuit synchronizes the requests with the frame clock.

2. The control device according to claim 1, wherein the control circuit controls electrical output power of the generator as an operating parameter.

3. The control device according to claim 2, wherein the control circuit controls the output power of the generator by taking into account a mechanical output demanded by the internal combustion engine.

4. The control device according to claim 1, wherein the second interface is a bit synchronous single-wire network (BSS) interface.

5. The control device according to claim 1, wherein the synchronization circuit and the second interface communicate using pulse-shaped signals, wherein the duration of each pulse represents digital information.

6. The control device according to claim 1, wherein the control processor simultaneously executes a plurality of program-controlled processes, including a management process and at least one translation process for translating a request received from the management process to one of detect an operating parameter of the generator and set the operating parameter to a given value, into a message compatible in format with a protocol supported by the second interface.

7. The control device according to claim 5, wherein the control circuit controls electrical output power of the generator as an operating parameter.

8. The control device according to claim 5, wherein the second interface is a bit synchronous single-wire network (BSS) interface.

9. The control device according to claim 5, wherein the control processor simultaneously executes a plurality of program-controlled processes, including a management process and at least one translation process for translating a request received from the management process to one of detect an operating parameter of the generator and set the operating parameter to a given value, into a message compatible in format with a protocol supported by the second interface.

10. The control device according to claim 6, wherein the control circuit controls electrical output power of the generator as an operating parameter.

11. The control device according to claim 6, wherein the second interface is a bit synchronous single-wire network (BSS) interface.

12. The control device according to claim 7, wherein the control circuit controls the output power of the generator by taking into account a mechanical output demanded by the internal combustion engine.

13. The control device according to claim 9, wherein the control circuit controls electrical output power of the generator as an operating parameter.

14. The control device according to claim 13, wherein the control circuit controls the output power of the generator by taking into account a mechanical output demanded by the internal combustion engine.

15. The control device according to claim 9, wherein the second interface is a bit synchronous single-wire network (BSS) interface.

16. The control device according to claim 10, wherein the control circuit controls the output power of the generator by taking into account a mechanical output demanded by the internal combustion engine.

* * * * *